H. CULL.
Combined Cupboard and Sink.
No. 161,389. Patented March 30, 1875.
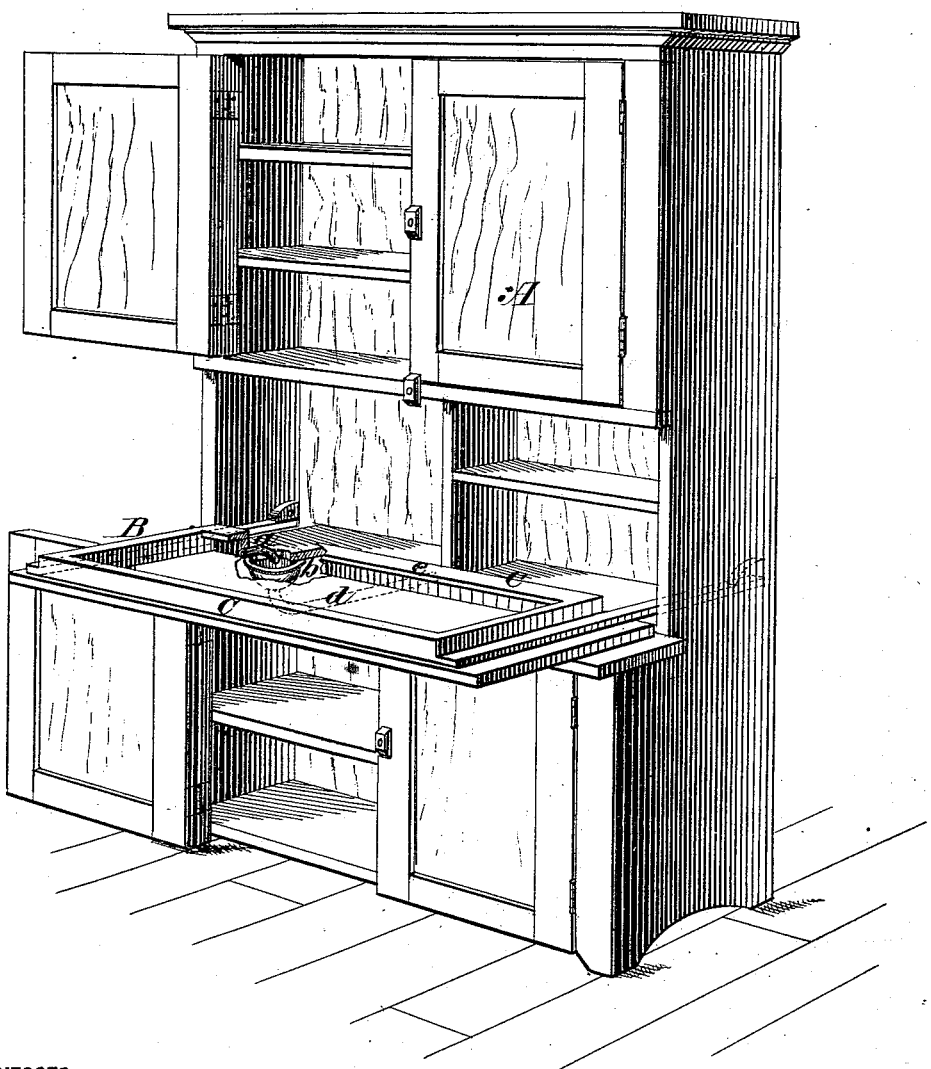

UNITED STATES PATENT OFFICE.

HENRY CULL, OF MARSHALLTOWN, IOWA.

IMPROVEMENT IN COMBINED CUPBOARDS AND SINKS.

Specification forming part of Letters Patent No. 161,389, dated March 30, 1875; application filed February 20, 1875.

*To all whom it may concern:*

Be it known that I, HENRY CULL, of Marshalltown, in the county of Marshall and State of Iowa, have invented a new and Improved Combined Cupboard and Sink, of which the following is a specification:

The accompanying drawing represents a perspective view of my improved cupboard or milk-safe and sink combined.

The object of my invention is to combine a cupboard, provision, or milk-safe with a sink in such a manner that on being closed it represents the appearance of a cupboard, while on being opened it furnishes a regular sink for the cleaning of dishes, &c.

The invention consists of a cupboard with a hinged lid, constructed as a sink, and connected by a short pipe with a receptacle and waste-pipe for conveying the water off.

In the drawing, A represents a cupboard, milk, provision, or other safe, which is provided, in the usual manner, with a hinged lid, B, that may be swung down on the lower broader part of the cupboard. The lid B is constructed at the inner side with a raised surrounding rim, C, that forms a space of sufficient depth to use as a sink for the washing of vessels, and for similar purposes.

The bottom of the sink is inclined from the front to the rear for the readier running off of the water to a short pipe, $a$, which is curved to extend into a spout or basin-shaped receptacle, $b$, with waste-pipe $d$ of the cupboard. The receptacle $b$ is made of sufficient size to admit the swinging of pipe $a$ therein in following the motion of the sink as the same is opened and closed.

All the drip-water is thereby conveyed off from the sink, which allows the closing of the cupboard directly after the use of the sink; a raised strip, $e$, at the upper interior edge of the rear rim C serving, furthermore, as a trough to convey the still adhering water to the waste-pipe.

The arrangement of sink and cupboard is very convenient for many purposes, and forms a neat and space-saving article of furniture for family, dairy, stores, and other purposes. The sink may be in one or more independent parts, and provided with rear arms, resting on lugs or stops at the sides of the cupboard, for giving a more secure and stronger support to the sink when in position for use.

Having thus described my invention, I claim as new and desire to secure by Letters Patent—

1. In combination with the cupboard A, the hinged or pivoted lid B, provided upon its inner surface with a raised edge, C, forming a sink when the lid is in a horizontal position, substantially as shown and described.

2. The combination of the sink, having inclined bottom, raised edge-strip at rear side, and exit-pipe, with a receptacle of sufficient size to admit the swinging of the exit-pipe therein, and a waste-pipe for the purpose of draining off the water in the open or closed position of the sink, substantially in the manner and for the purpose set forth.

HENRY CULL.

Witnesses:
C. B. PINKHAM,
T. C. SINCLAIR.